United States Patent [19]

Berecz

[11] Patent Number: 5,503,600
[45] Date of Patent: Apr. 2, 1996

[54] DERAILLEUR GEAR ASSEMBLY

[75] Inventor: Imre Berecz, Coto De Caza, Calif.

[73] Assignee: Kaynar Technologies, Inc., Fullerton, Calif.

[21] Appl. No.: 341,385

[22] Filed: Nov. 17, 1994

[51] Int. Cl.⁶ ................................................. F16H 55/30
[52] U.S. Cl. ............................................................ 474/160
[58] Field of Search ..................................... 474/140, 160, 474/164, 144, 152

[56] References Cited

U.S. PATENT DOCUMENTS

| | | | |
|---|---|---|---|
| 3,900,088 | 8/1975 | Ozaki | 192/64 |
| 4,439,172 | 3/1984 | Segawa | 474/160 |
| 4,472,163 | 9/1984 | Bottini | 474/160 |
| 4,486,184 | 12/1984 | Campagnolo | 474/165 |
| 5,194,051 | 3/1993 | Nagano | 474/160 |

Primary Examiner—Michael Powell Buiz
Attorney, Agent, or Firm—Lyman R. Lyon

[57] ABSTRACT

A gear sub-assembly for a bicycle chain derailleur system comprises a plurality of gears of different pitch diameter oriented and retained in a conical array by gear support arms having locking means at each end thereof releasably engageable with the gears at each end of said gear sub-assembly. Torque is transmitted from the gears intermediate the end gears to said arms, thence to the end gears, thence to a wheel hub.

3 Claims, 3 Drawing Sheets

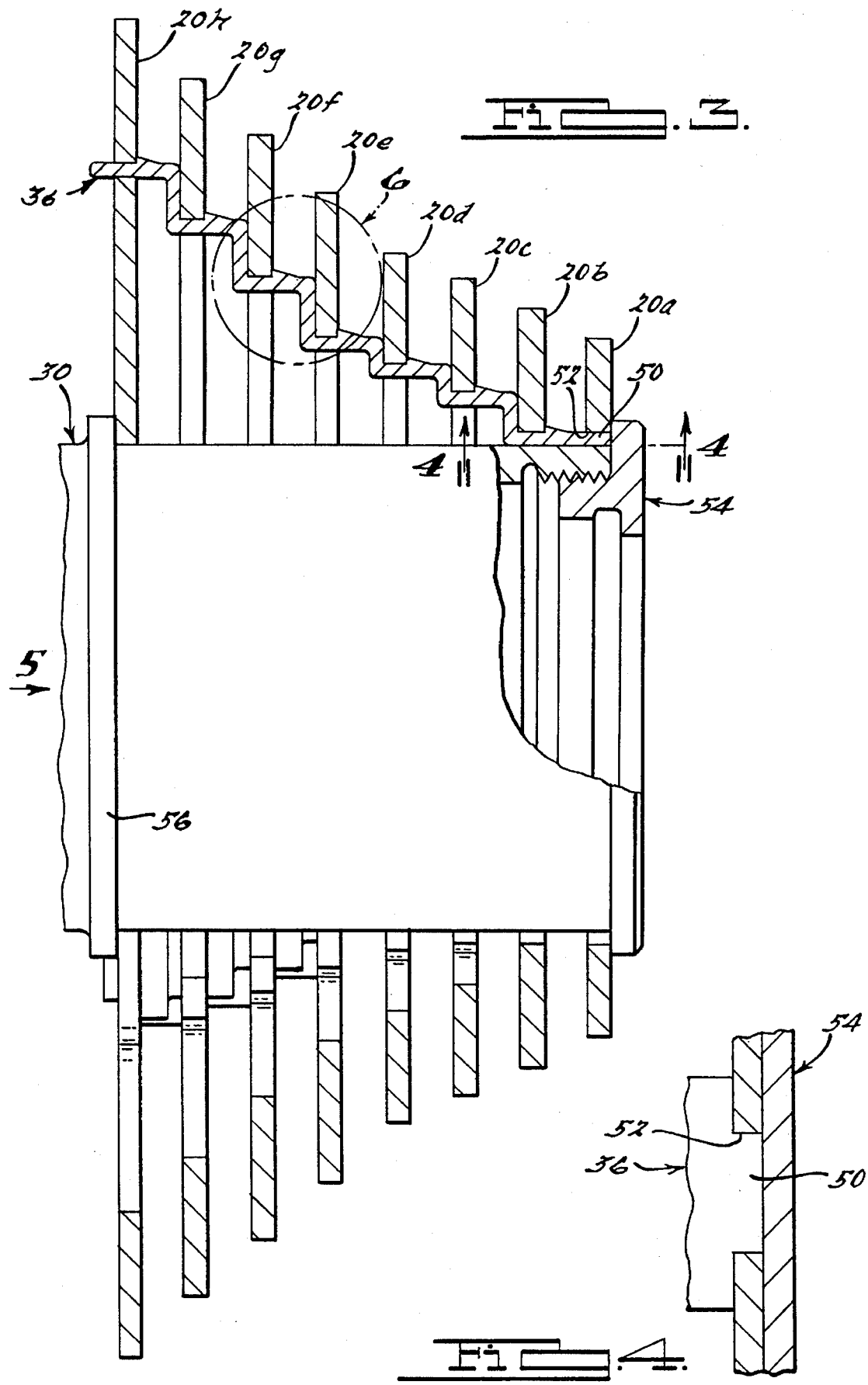

5,503,600

DERAILLEUR GEAR ASSEMBLY

BACKGROUND O THE INVENTION

1. Field of the Invention

The present invention relates to a lightweight, quick change, derailleur gear sub-assembly for a bicycle.

2. Description of the Prior Art

Bicycle racing enthusiasts have two prime considerations when purchasing a bicycle, namely, weight and the ability of the bicycle to be rapidly repaired in the event of a breakdown in the middle of a race. The gear shift mechanism of such racing bicycles is of prime interest since known shift mechanisms are relatively heavy, susceptible of failure, and difficult to strip and repair in the field.

Specifically, one popular gear shift system, known as a "derailleur" system, comprises a plurality of chain sprockets of varying pitch diameter that are orientated in a coaxial, axially spaced conical array, a mechanism that alters the direction of movement of the chain thereby causing the chain to jump from one sprocket to another, and a spring biased idler gear that maintains a predetermined tension on the chain.

While the multiple speeds provided by such derailleur gear systems render them attractive, the weight of their gear sub-assembly and lack of rapid repair capability has heretofore presented a negative aspect to their use. This problem was partially addressed in U.S. Pat. No. 5,194,051 which discloses a gear mounting hub having a plurality of integral multistep gear support arms extending radially outwardly and axially therefrom. However, the cantilevered gear support arms and integral hub are, of necessity, relatively heavy. In addition, field strip and repair is time consuming and relatively difficult since the gears are secured to their support by conventional fasteners.

SUMMARY OF THE INVENTION

A derailleur gear sub-assembly, in accordance with a preferred and constructed embodiment of the invention, comprises a plurality of gears that are supported in a conical array by three gear mounting arms. The mounting arms are orientated in axially inwardly radially divergent relation to the central axis of a bicycle wheel. The gear mounting arms are mechanically interlocked in quick disconnect relation to the smallest and largest of the gears so as to define and position the intermediate gears in the conical array.

A plurality of stepped surfaces are formed on each of the gear support arms including vertical surfaces substantially perpendicular to the wheel axis and horizontal surfaces substantially parallel to the wheel axis. The gear support arms retain the gears in an easily removable sub-assembly that is independent of a mounting hub and minimizes weight of the gear system. The mechanical interlock between the arms and the gears is devoid of fasteners thereby facilitating rapid field repair.

The intermediate gears transfer the pedaling force to the wheel hub through the gear mounting arms connected to the smallest and largest gears, thereby eliminating the need to have the intermedial gears contact the wheel hub for load transfer, resulting in a relatively light gear assembly.

BRIEF DESCRIPTION OF THE DRAWINGS

FIG. 3 is a sectional view, partly broken away, taken along the line 3—3 of FIG. 2;

FIG. 4 is a section view, partly broken away, taken along the line 4—4 of FIG. 3;

DETAILED DESCRIPTION OF THE PREFERRED EMBODIMENT(S)

Figure 1:
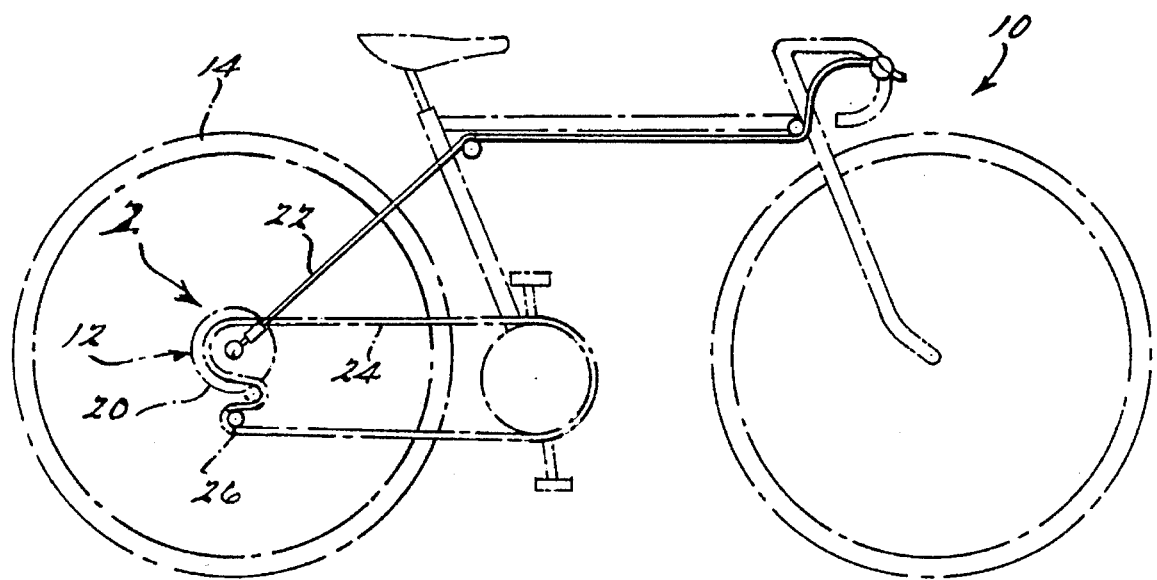
FIG. 1 is a side elevation of a bicycle showing the location of the derailleur gear system of the present invention.
Figure 2:
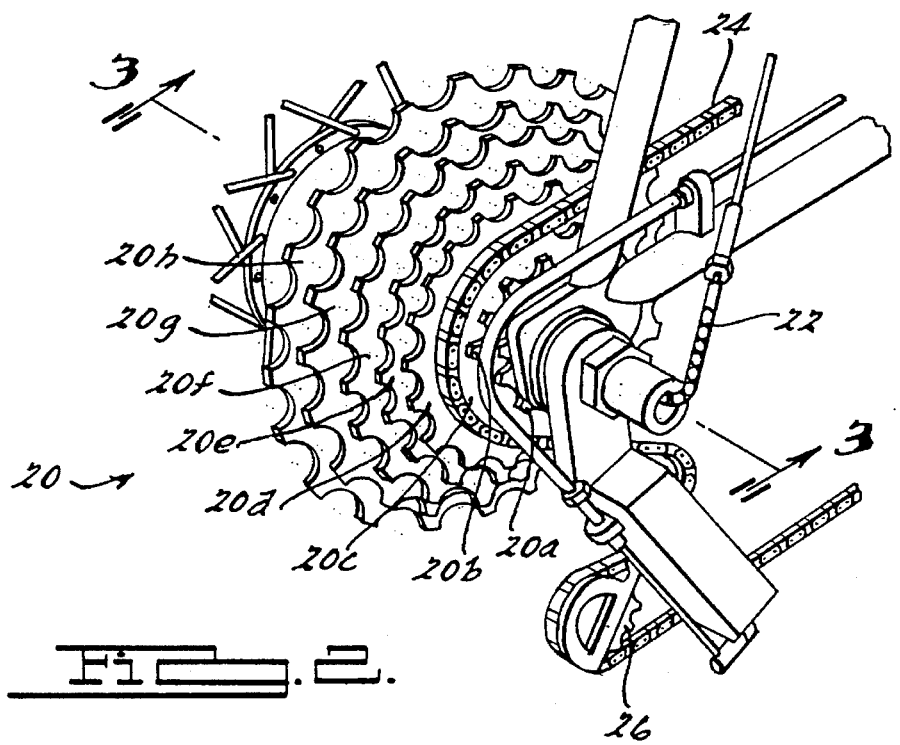
FIG. 2 is a perspective view taken in the direction of the arrow 2 of FIG. 1.
Figure 5:
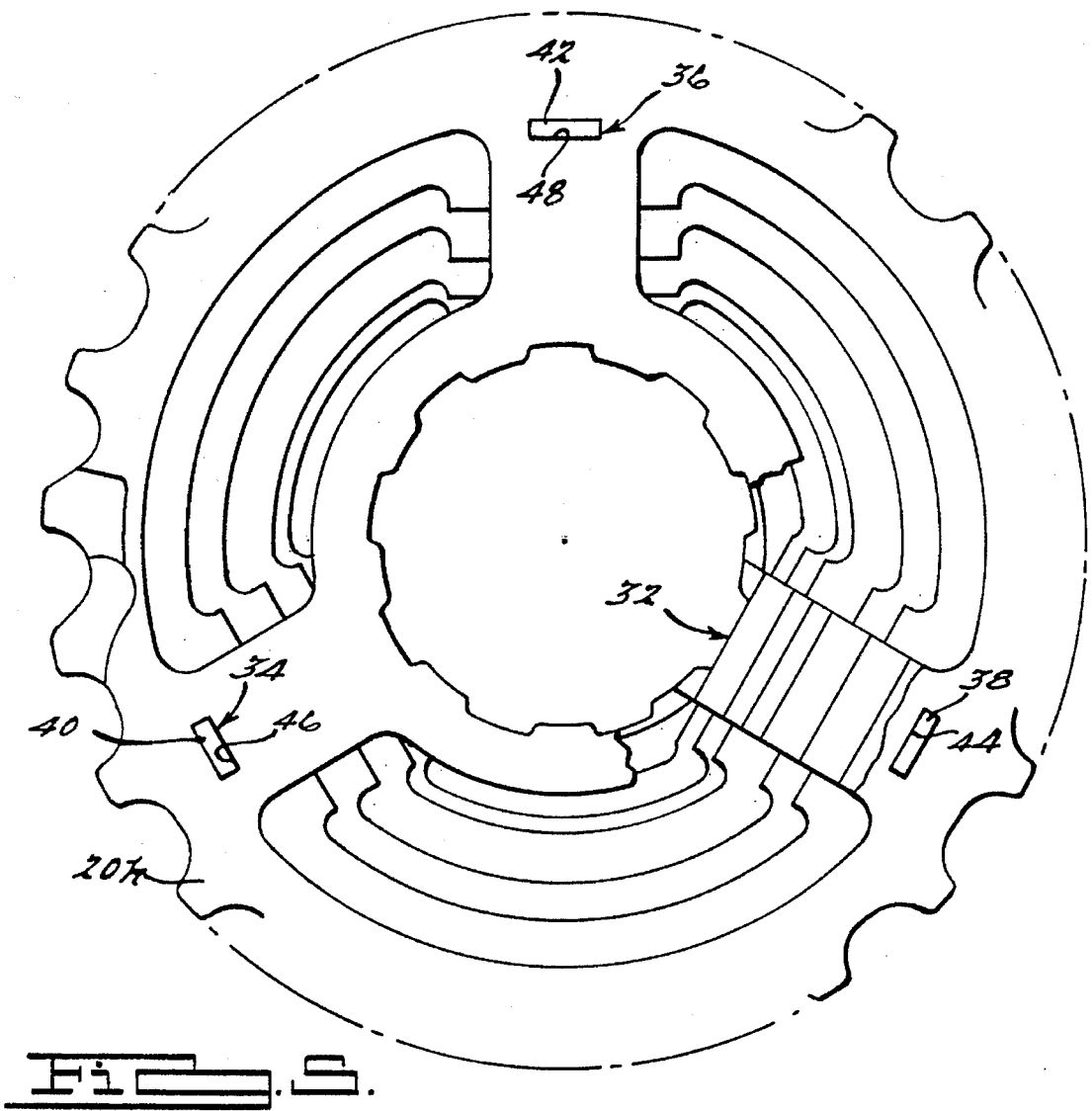
FIG. 5 is a view taken in the direction of the arrow 5 of FIG. 3.

As seen in FIG. 1, a bicycle 10 is provided with a multigear derailleur gear system 12 on a rear wheel 14 thereof that embodies the present invention. The derailleur gear system 12 comprises a gear sub-assembly 20, shift mechanism 22 that alters the direction of movement of a chain 24 causing it to jump from one gear to another, and a spring biased idler gear 26 that takes up slack in the chain 24 due to a gear change.

As best seen in FIG. 3, the gear sub-assembly 20 is mounted directly on a splined hub 30 of the rear wheel 14. The gear sub-assembly 20 comprises, for example, eight gears of different pitch diameter 20a–20h that are supported in axially spaced relation by three gear support arms 32, 34 and 36. The gear support arms 32, 34 and 36 have ears 38, 40 and 42, at their inboard ends, respectively, that extend through complementary notches 44, 46 and 48 in the inboard high pitch diameter gear 20h so as to removably lock the arms 32, 34 and 36 into the gear 20h. Similarly, the arms 32, 34 and 36 have ears at their outboard ends, respectively, one of which is shown and designated by the number 50. The ears 50 on the arms 32, 34 and 36 are accepted in complementary notches in the outboard gear 20a one of which is shown and designated by the numeral 52.

The gear sub-assembly 20 comprising the gears 20a–20h and arms 32, 34 and 36 slides onto the splined hub 30 as an assembly against an annular shoulder 56 on the hub 30. The gear sub-assembly 20 is retained on the hub 30 by an end cap 54 which biases the gear sub-assembly 20 against the annular shoulder 56 on the hub 30.

Figure 6:
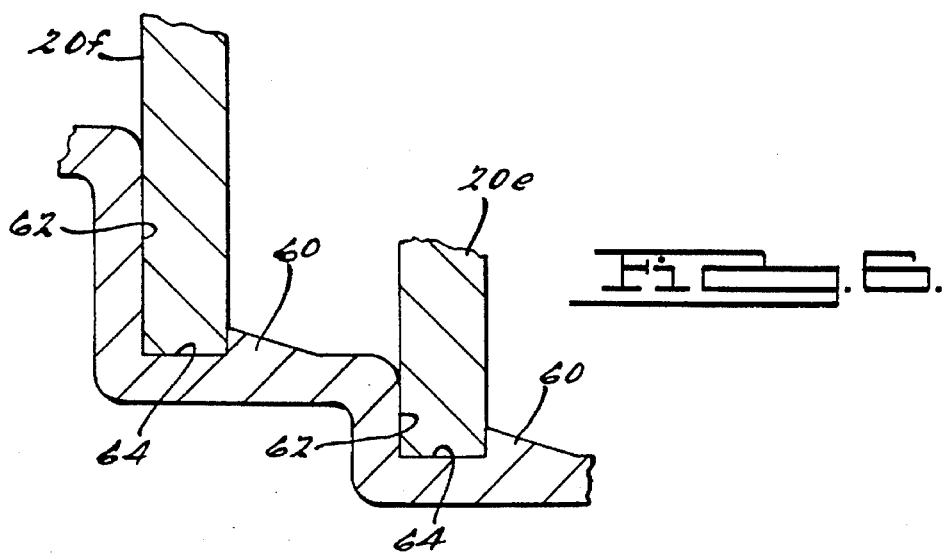
FIG. 6 is a view taken within the circle 6 of FIG. 3.

In accordance with another feature of the present invention, and as best seen in FIG. 6, the gears 20a–20h are retained in axially spaced coaxial relation on the arms 32, 34 and 36 by locking detents 60 that are orientated in a stepped array on the arms 32, 34 and 36. The detents 60 are forged or coined into the arms 32, 34 and 36 and lock the gears 20a–20h against adjacent radially extending walls 62 and axially extending steps 64 on the arms, 32 34 and 36.

Field strip of the gear sub-assembly 20 to effect, for example, gear replacement, is easily accomplished by merely backing off the end cap 54 from the wheel hub 30 and sliding the gear sub-assembly 20 axially thereof. After disassociation of the gear sub-assembly 20 from the hub 30, the outboard gears 20a and/or 20b are withdrawn from the gear sub-assembly 20 and the arms 32, 34 and 36 are rotated radially inwardly until disassociated from the gears 20b–20g. Reinstallation of the gear sub-assembly 20 into the derailleur system on the wheel 14 is merely the reverse of the aforesaid procedure.

From the foregoing it should be apparent that the intermediate gears 20b–20g transfer the pedaling force to the wheel hub 30 through the gear mounting arms 32, 34 and 36 which, in turn, are connected to the smallest gear 20a and largest gear 20h, thereby eliminating the need to have the intermediate gears 20b–20gcontact the wheel hub 30 for load transfer, resulting in a relatively light gear assembly.

While the preferred embodiment of the invention has been disclosed, it should be appreciated that the invention is susceptible of modification without departing from the scope of the following claims.

I claim:

1. In a bicycle having a chain derailleur system, a gear sub-assembly for transmitting pedal torque from the chain to a wheel hub comprising:

a plurality of gears of different pitch diameter oriented in a coaxial, axially spaced, truncated conical array;

a plurality of discrete circumferentially spaced gear support arms disposed radially inwardly of the pitch diameters of said gears and extending radially outwardly in a conical array complementary to the conical array of said gears, said arms having engagement means at each end thereof releasably engageable with the gears at each end of said gear sub-assembly and a plurality of gear seats intermediate the engagement means thereon for mechanically positioning and releasably engaging the gears in said conical array; and means on the gears at each axial end of said gear sub-assembly, respectively, for releasably accepting the engagement means on said arms, respectively, whereby said support arms are mechanically and individually releasably engaged with each of said gears to form a structurally self-sufficient gear sub-assembly wherein torque on the gears intermediate the end gears of said gear sub-assembly is transmitted through said gear support arms to one of said end gears, thence to said wheel hub.

2. The gear sub-assembly of claim 1 wherein said gears are locked on the gear seats on said arms by radially extending detents.

3. The gear sub-assembly of claim 1 wherein the engagement means on said arms comprises ears at each end thereof that are releasably accepted in complementary notches in the gears at opposite ends of said gear sub-assembly.

* * * * *